US009485111B2

(12) United States Patent
Kido et al.

(10) Patent No.: US 9,485,111 B2
(45) Date of Patent: Nov. 1, 2016

(54) MONITORING SYSTEM

(71) Applicant: Panasonic Intellectual Property Management Co., Ltd., Osaka (JP)

(72) Inventors: Noriaki Kido, Fukuoka (JP); Nobuyuki Wada, Fukuoka (JP); Hiroshi Tsuji, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1 day.

(21) Appl. No.: 14/687,793

(22) Filed: Apr. 15, 2015

(65) Prior Publication Data

US 2016/0149718 A1 May 26, 2016

(30) Foreign Application Priority Data

Nov. 20, 2014 (JP) ................................. 2014-235961

(51) Int. Cl.
*H04N 7/18* (2006.01)
*H04L 12/28* (2006.01)
*G08B 13/196* (2006.01)
(Continued)

(52) U.S. Cl.
CPC ....... *H04L 12/2814* (2013.01); *G08B 13/1966* (2013.01); *G08B 13/19684* (2013.01); *G08B 21/028* (2013.01); *G08B 21/0208* (2013.01); *G08B 25/009* (2013.01); *G08B 25/10* (2013.01); *H04N 7/181* (2013.01); *G08B 13/19682* (2013.01); *H04L 2012/2841* (2013.01); *H04L 2012/2849* (2013.01)

(58) Field of Classification Search
CPC ........................... G08B 13/2491; H04N 7/185
USPC .................................................. 348/143–160
See application file for complete search history.

(56) References Cited

U.S. PATENT DOCUMENTS

| | | |
|---|---|---|
| 2005/0262519 A1 | 11/2005 | Luebke et al. |
| 2006/0209176 A1 | 9/2006 | Nakamura et al. |

(Continued)

FOREIGN PATENT DOCUMENTS

| | | |
|---|---|---|
| JP | 3039783 U | 7/1997 |
| JP | 2006-039964 A | 2/2006 |
| JP | 2007-179555 A | 7/2007 |
| JP | 2007-323533 A | 12/2007 |

OTHER PUBLICATIONS

Dragomir et al.,"WSN Management in a multi-user secure context", Roedunet International Conference (Roedunet), 2013 11th, IEEE, Jan. 17, 2013, pp. 1-4.

(Continued)

*Primary Examiner* — Andy Rao
(74) *Attorney, Agent, or Firm* — Seed IP Law Group (57) ABSTRACT

In a monitoring system, a master device stores setting information indicating a predetermined state for detecting a target by using a sensor in a storage unit, and transmits the setting information to a camera (a baby monitoring camera or a monitoring camera) having a sensor built thereinto or correlated with a sensor so as to set a detection parameter therein. When the predetermined state set by the detection parameter is detected, the camera transmits a detection notification to the master device. When the detection notification is received from the camera, the master device transmits detection notification information to a smartphone, and the smartphone displays a detection information screen based on the detection notification information transmitted from the master device on a display/input unit.

16 Claims, 10 Drawing Sheets

(51) Int. Cl.
    *G08B 21/02* (2006.01)
    *G08B 25/00* (2006.01)
    *G08B 25/10* (2006.01)

(56) References Cited

U.S. PATENT DOCUMENTS

| | | | |
|---|---|---|---|
| 2014/0218517 A1 | 8/2014 | Kim et al. | |
| 2015/0296165 A1* | 10/2015 | Sato | G08B 25/08 348/158 |
| 2016/0148478 A1* | 5/2016 | Wakeyama | G08B 13/19684 348/152 |

OTHER PUBLICATIONS

Saha et al., "On Security of a Home Energy Management System", IEEE PES Innovative Smart Grid Technologies, Europe, IEEE, Oct. 12, 2014, pp. 1-5.

International Search Report and Written Opinion mailed Jul. 27, 2015, for corresponding International Application No. PCT/JP2015/001265, 16 pages.

Extended European Search Report, dated Apr. 5, 2016, for corresponding EP Application No. 15194960.9-1810, 13 pages.

\* cited by examiner

MONITORING SYSTEM

BACKGROUND OF THE INVENTION

1. Field of the Invention

The present invention relates to a monitoring system which performs data input and output between a mobile phone terminal and a camera.

2. Description of the Related Art

In the related art, as an example of a monitoring system in which data input and output are performed between a mobile phone terminal and a camera, there is a monitoring camera system which easily performs remote monitoring even from a remote location and monitors a monitoring target by using bidirectional communication of video and sound (for example, refer to Japanese Patent Unexamined Publication No. 2007-323533)

The monitoring system disclosed in Japanese Patent Unexamined Publication No. 2007-323533 includes a controller which is a monitoring server installed at an indoor distribution board in a predetermined house lot (within a house), a first camera unit which is an interphone master device installed at an entrance door, a second camera unit which is installed in a dining room, a third camera unit which is installed in a bedroom, an indoor unit which is an interphone master device installed in a living room, and one or more mobile phones present at remote places. For example, in a case where a dweller is out, when each camera unit detects an intruder, the controller switches and transmits a captured video signal and a collected audio signal to the mobile phone so as to capture the intruder.

SUMMARY OF THE INVENTION

However, in the above-described configuration disclosed in Japanese Patent Unexamined Publication No. 2007-323533, since a video signal and an audio signal from each camera unit are appropriately switched and transmitted to the mobile phone so as to capture motions and sound of the intruder, a configuration of the controller is complex, and this inevitably leads to an increase in cost, and it is difficult to implement a monitoring system including the controller at low cost.

In order to solve the above-described problems, an object of the present invention is to provide a monitoring system which realizes data input and output between a mobile phone terminal and a camera without damaging user's convenience by using an existing fixed telephone which is connected to a fixed telephone network and can perform calls to other fixed telephones.

According to the present invention, there is provided a monitoring system including a sensor; a camera that includes an image capturing unit, is provided in correlation with the sensor, and has a call function; a master device that communicates with the camera, and is connected to a fixed telephone network so as to perform calls to other fixed telephones; and a mobile phone terminal that includes a display/input unit, performs wireless communication with the master device by using a wireless router, and is connected to other mobile phones via a mobile phone network, in which the master device stores setting information indicating a predetermined state detected by the sensor in a storage unit, and transmits the setting information to the sensor so as to set a detection parameter therein, in which, when the predetermined state set by the detection parameter is detected, the sensor transmits a detection notification to the master device, in which, when the detection notification is received from the sensor, the master device transmits detection notification information to the mobile phone terminal, and in which the mobile phone terminal displays a detection information screen based on the detection notification information transmitted from the master device on the display/input unit.

According to the present invention, it is possible to realize data input and output between a mobile phone terminal and a camera without damaging user's convenience by using an existing fixed telephone which is connected to a fixed telephone network and can perform calls to other fixed telephones.

DETAILED DESCRIPTION OF THE PREFERRED EMBODIMENT

With reference to the drawings, a description will be made of an embodiment (hereinafter, referred to as "the present embodiment") of a monitoring camera system related to the present invention. In the following present embodiment, as an example of a monitoring camera system related to the present invention, an exemplary monitoring camera system used for home security will be described. The present invention is not limited to a monitoring camera system, and may be represented as each of devices constituting the monitoring camera system, a method for each device, and a program.

A monitoring system of the present embodiment includes a sensor; a camera that includes an image capturing unit, is provided in correlation with the sensor, and has a call function; a master device that communicates with the camera, and is connected to a fixed telephone network so as to perform calls to other fixed telephones; and a mobile phone terminal that includes a display/input unit, performs wireless communication with the master device by using a wireless router, and is connected to other mobile phones via a mobile phone network, in which the master device stores setting information indicating a predetermined state detected by the sensor in a storage unit, and transmits the setting information to the sensor so as to set a detection parameter therein, in which, when the predetermined state set by the detection parameter is detected, the sensor transmits a detection notification to the master device, in which, when the detection notification is received from the sensor, the master device transmits detection notification information to the mobile phone terminal, and in which the mobile phone terminal displays a detection information screen based on the detection notification information transmitted from the master device on the display/input unit.

Figure 1:
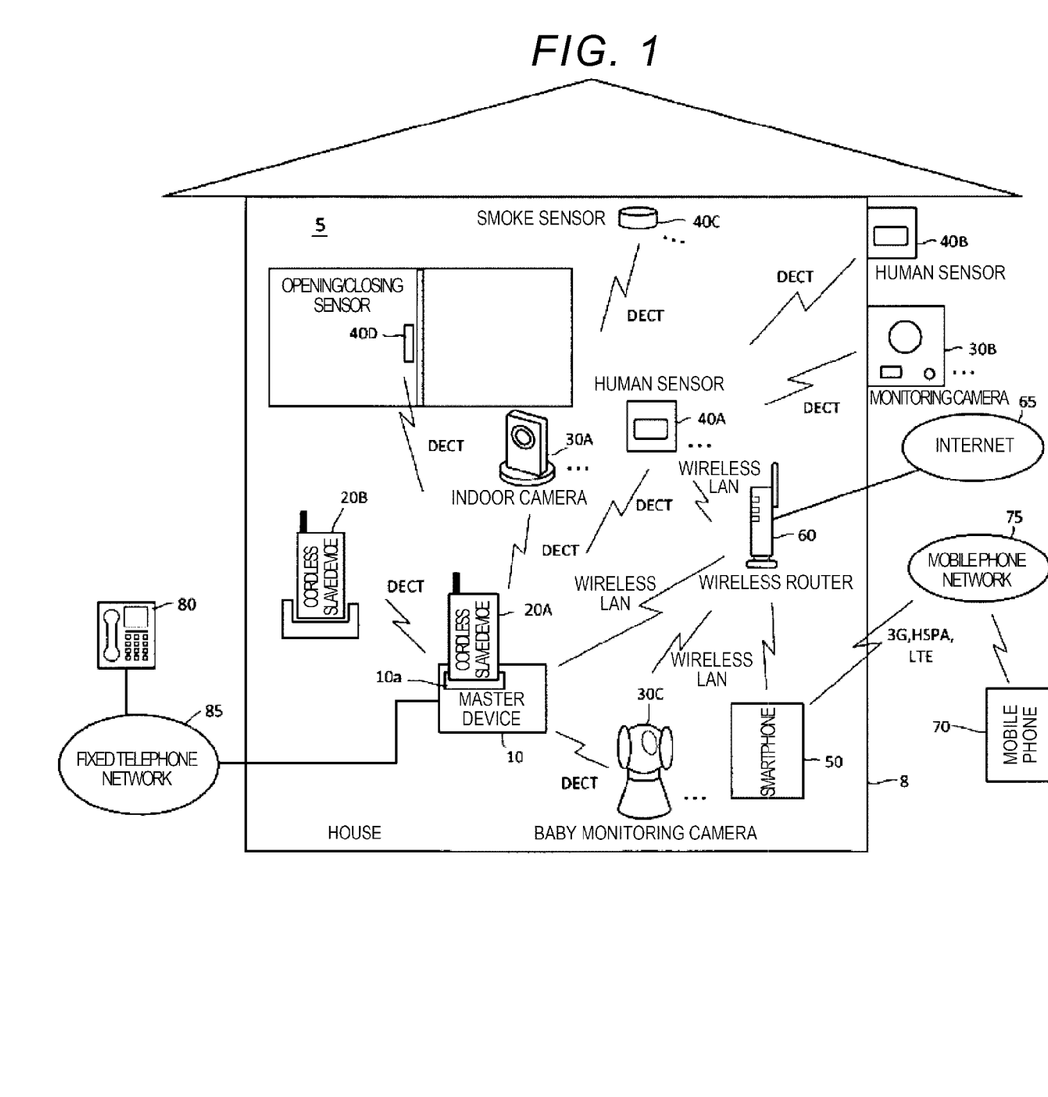
FIG. 1 is a diagram illustrating an example of a system configuration of a monitoring camera system of the present embodiment.

FIG. 1 is a diagram illustrating an example of a system configuration of monitoring camera system 5 of the present embodiment. Monitoring camera system 5 is mainly provided in house 8, and includes master device 10, two cordless slave devices 20A and 20B (hereinafter, simply referred to as "slave devices"), a plurality of cameras (specifically, indoor camera 30A, monitoring camera 30B, baby monitoring camera 30C, . . . ), various sensors (specifically, human sensors 40A and 40B, smoke sensor 40C, and opening/closing sensor 40D), smartphone 50, and wireless router 60. A configuration of monitoring camera system 5 is only an example and may be modified in various aspects.

Master device 10 functions as a gateway in monitoring camera system 5. Master device 10 is a control device which controls the entire operation of monitoring camera system 5, and is connected to the slave devices, the cameras, the sensors, and the like in a communicable manner by using a communication method such as digital enhanced cordless telecommunications (DECT). Master device 10 is connected to the Internet 65 (network) via wireless router 60 using a wireless LAN. Master device 10 is connected to fixed telephone network 85 in a wired manner and can perform a call to fixed telephone 80. Master device 10 has a function of charging slave device 20A which is inserted into insertion port 10a.

Slave devices 20A and 20B are connected to master device 10 in the DECT communication method and can perform a call to master device 10. Particularly, in a case where two slave devices 20A and 20B are not required to be differentiated from each other, the slave devices are collectively referred to as slave device 20.

Various sensors 40 (specifically, human sensors 40A and 40B, smoke sensor 40C, opening/closing sensor 40D, . . . ) are connected to master device 10 in the DECT communication method. Herein, as sensors, opening/closing sensor 40D which detects opening and closing of a window, smoke sensor 40C which detects smoke, and human sensors 40A and 40B which detect a person with infrared rays are used. Particularly, in a case where the sensors are not required to be differentiated from each other, the sensors are collectively referred to as sensor 40. As will be described later, infrared sensor 313 (refer to FIG. 4) built into camera 30 is also used as a human sensor.

A plurality of cameras (specifically, indoor camera 30A, monitoring camera 30B, baby monitoring camera 30C, . . . ) have a call function and are connected to master device 10 in the DECT communication method. Herein, as cameras, monitoring camera 30B which captures an image of an outdoor environment, indoor camera 30A which captures an image of house 8, and baby monitoring camera 30C which captures an image of a sleeping location of an infant (for example, a baby bed (not illustrated) or the vicinity thereof), are used. Particularly, in a case where the cameras are not required to be differentiated from each other, the cameras are collectively referred to as camera 30.

Smartphone 50 is provided as an example of a mobile phone terminal. Smartphone 50 is connected to master device 10 via wireless router 60 using a wireless LAN, and is connected to mobile phone 70 or other smartphones via a mobile phone network 75 using communication method such as the third generation (3G) method, a high speed package access (HSPA) method, or a long term evolution (LTE) method.

Figure 2:
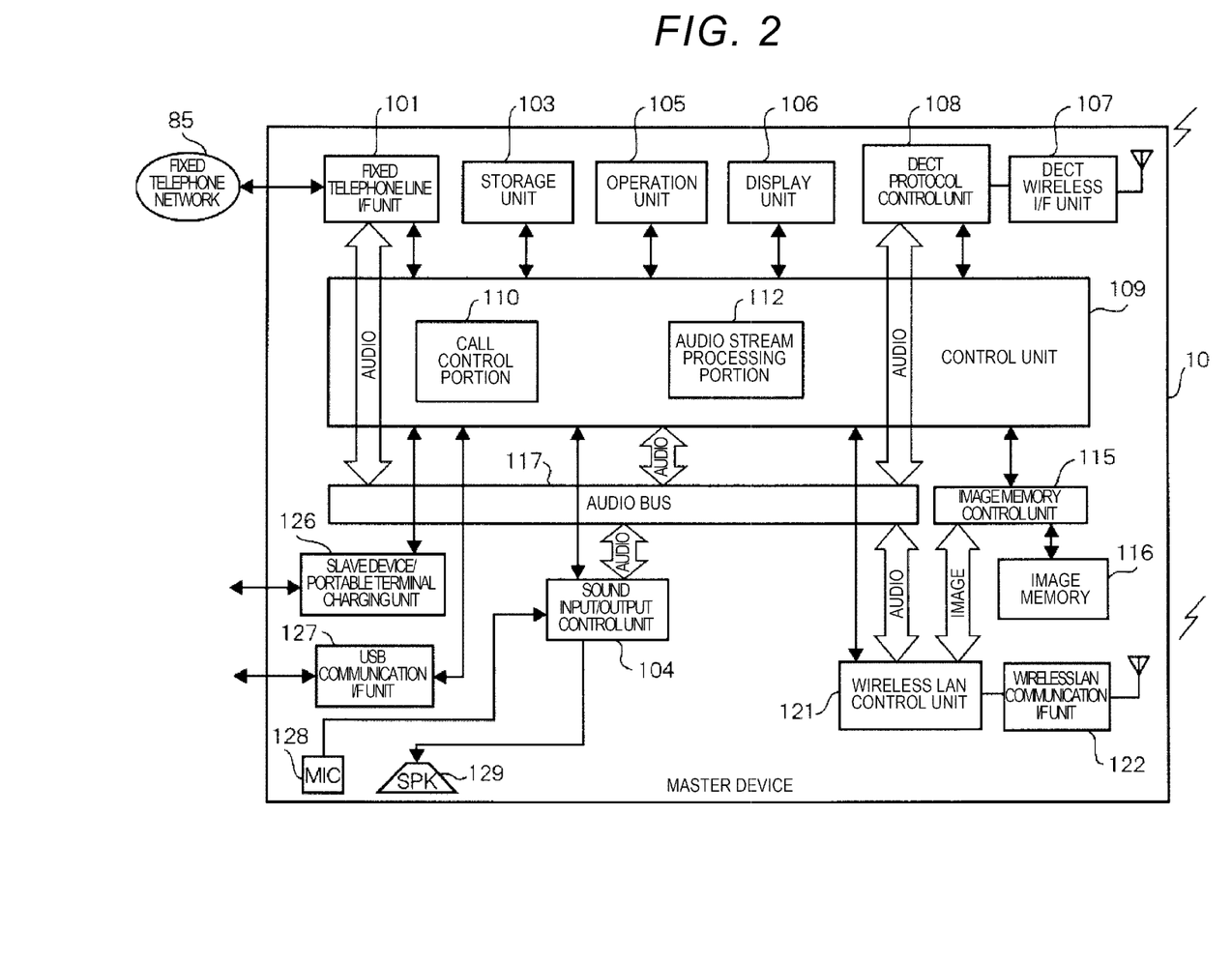
FIG. 2 is a block diagram illustrating an example of an internal configuration of a master device.

FIG. 2 is a block diagram illustrating an example of an internal configuration of master device 10. Master device 10 includes control unit 109, storage unit 103, operation unit 105, and display unit 106. Master device 10 receives various input operations and displays information such as image on display unit 106. Control unit 109 has call control portion 110 and audio stream processing portion 112 built thereinto, and performs call control during calling, processing of audio data, and the like.

Master device 10 includes image memory control unit 115 and image memory 116, and stores image data or the like captured by camera 30 in image memory 116.

Master device 10 includes wireless LAN control unit 121 and wireless LAN communication I/F unit 122, and transmits and receives image data and audio data to and from smartphone 50, camera 30, and the like via wireless router 60 connected over a wireless LAN.

Master device 10 includes DECT protocol control unit 108 and DECT wireless I/F unit 107, and performs wireless connection to slave device 20, sensor 40, and camera 30 by using a wireless method such as digital enhanced cordless telecommunications (DECT).

Master device 10 includes audio bus 117, sound input/output control unit 104, speaker 129, and microphone 128, and performs input and output of sound to and from an external device.

Master device 10 includes fixed telephone line I/F unit 101, and can perform a call to external fixed telephone 80 connected to fixed telephone network 85.

Master device 10 includes slave device/portable terminal charging unit 126 and charges slave device 20 or smartphone 50 inserted into insertion port 10a.

Master device 10 includes USB communication I/F unit 127, and transmits and receives data to and from an apparatus, a memory, or the like having an interface of a universal serial bus (USB) standard.

Master device 10 registers pairs of various sensors 40 and the plurality of cameras 30 in storage unit 103 in correlation with each other. For example, human sensor 40B and monitoring camera 30B are installed at close locations outdoors and are thus registered in correlation with each other. Monitoring camera 30B, as will be described later, integrally has infrared sensor 313 (refer to FIG. 4) which is a human sensor and is built thereinto, and is thus also registered in correlation with infrared sensor 313. Human sensor 40A, smoke sensor 40C, and opening/closing sensor 40D are all installed inside house 8 and are thus registered in correlation with either indoor camera 30A or baby monitoring camera 30C. As baby monitoring camera 30C, a camera which has a temperature sensor or the like built thereinto may be used, and, in this case, the built-in sensor is registered in correlation with baby monitoring camera 30C.

Figure 3:
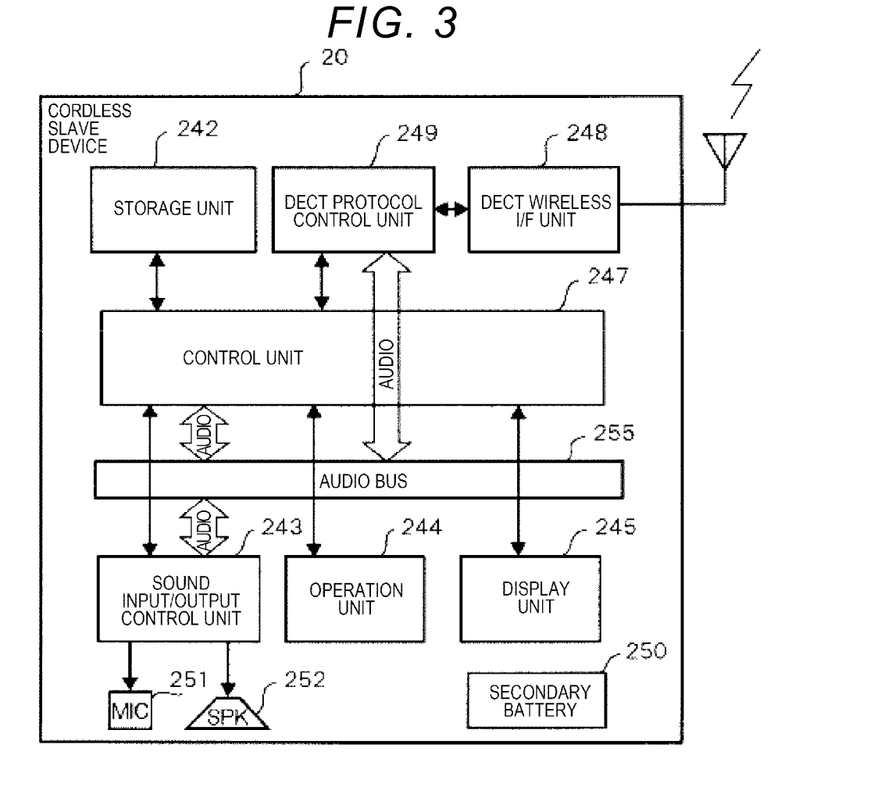
FIG. 3 is a block diagram illustrating an example of an internal configuration of a cordless slave device.

FIG. 3 is a block diagram illustrating an example of an internal configuration of (cordless) slave device 20. Slave device 20 includes control unit 247, storage unit 242, operation unit 244, and display unit 245. Slave device 20 receives various input operations and displays information such as an image on display unit 245.

Slave device 20 includes DECT protocol control unit 249 and DECT wireless I/F unit 248, and performs wireless connection to master device 10, sensor 40, and camera 30 by using a wireless method such as DECT.

Slave device 20 includes audio bus 255, sound input/output control unit 243, speaker 252, and microphone 251, and performs input and output of sound to and from an external device.

Slave device 20 includes secondary battery 250 which is rechargeable, and, in a case of being used as a cordless slave device, each unit of slave device 20 is supplied with power from secondary battery 250 so as to perform an operation.

Figure 4:
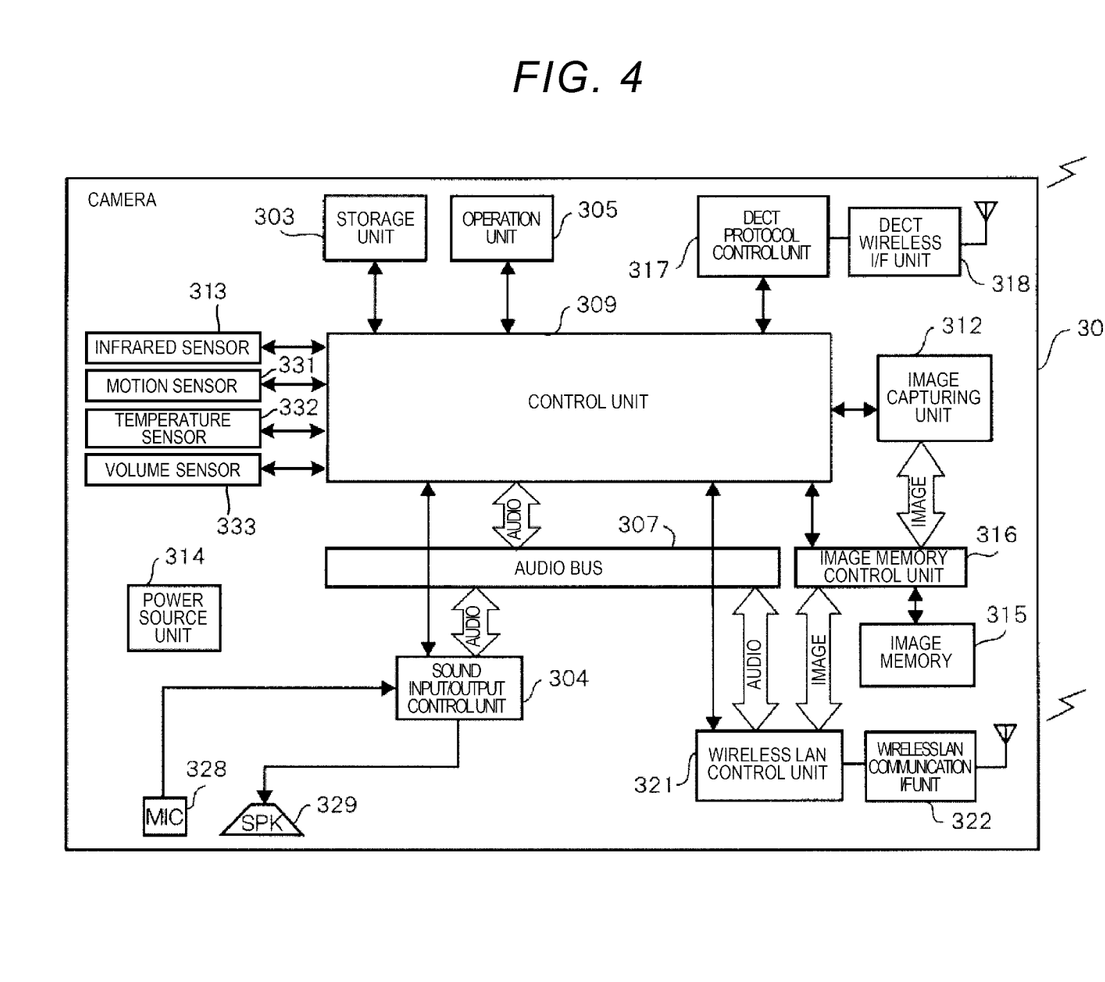
FIG. 4 is a block diagram illustrating an example of an internal configuration of a camera.

FIG. 4 is a block diagram illustrating an example of an internal configuration of camera 30. Indoor camera 30A, monitoring camera 30B, and baby monitoring camera 30C as examples of cameras 30 have substantially the same configuration as each other. Camera 30 includes control unit 309, storage unit 303, and operation unit 305. Camera 30 performs an operation related to image capturing and also receives input operations.

Camera 30 includes DECT protocol control unit 317 and DECT wireless I/F unit 318, and performs wireless connection to master device 10 by using a wireless method such as DECT.

Camera 30 includes wireless LAN control unit 321 and wireless LAN communication I/F unit 322, and transmits and receives image data and audio data to and from master device 10, smartphone 50, and the like via wireless router 60 connected over the wireless LAN.

Camera 30 includes audio bus 307, sound input/output control unit 304, speaker 329, and microphone 328, and performs input and output of sound to and from an external device.

Camera 30 includes image capturing unit 312, image memory control unit 316, and image memory 315, and stores image data captured by image capturing unit 312 in image memory 315. Image capturing unit 312 has a lens and an imaging element (for example, an image sensor such as a charged coupled device (CCD) or a complementary metal oxide semiconductor (CMOS)).

Camera 30 integrally has infrared sensor 313 which is a passive infrared (PIR) sensor as a human sensor built thereinto. Infrared sensor 313 detects the presence of a person by detecting a change in heat (infrared rays) generated by the person. However, infrared sensor 313 illustrated in FIG. 4 is not provided in baby monitoring camera 30C illustrated in FIG. 1. Camera 30 may have motion sensor 331 which detects a motion in an image captured by image capturing unit 312, temperature sensor 332 which detects an ambient temperature, volume sensor 333 which detects a volume level of a sound collected by microphone 328, and the like built thereinto. Herein, it is assumed that motion sensor 331, temperature sensor 332, and volume sensor 333 are built into baby monitoring camera 30C. Camera 30 includes power source unit 314 which is constituted by a commercial AC power source, and each unit of camera 30 is supplied with power from power source unit 314 so as to perform an operation.

Figure 5:
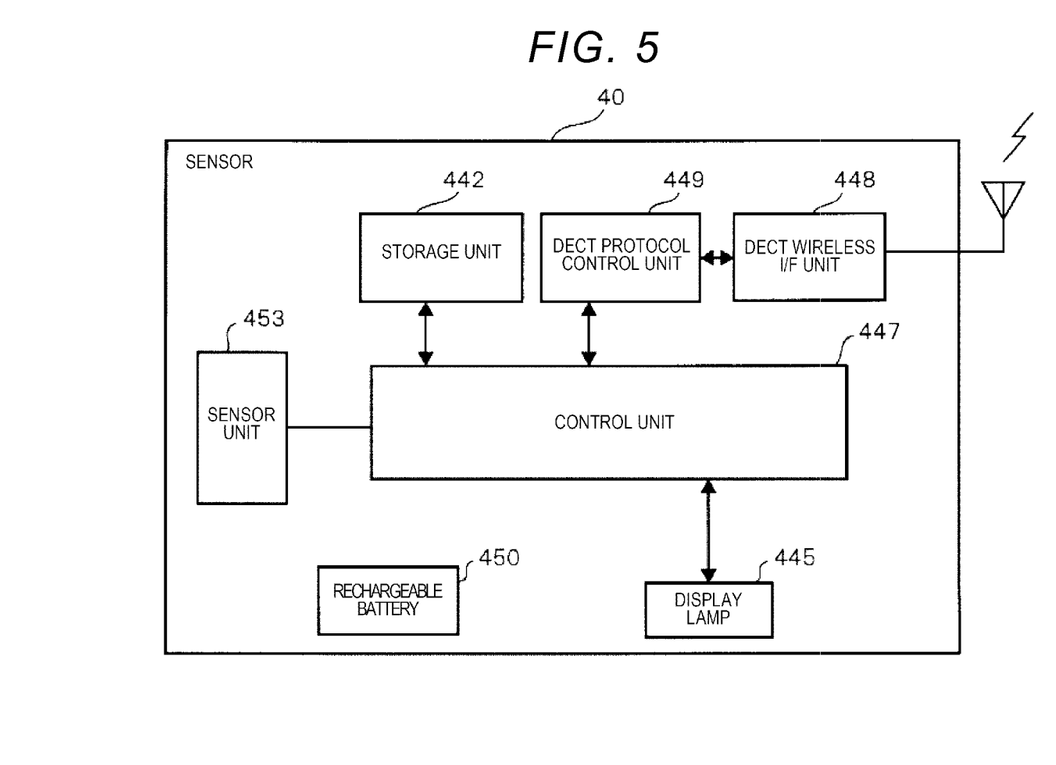
FIG. 5 is a block diagram illustrating an example of an internal configuration of a sensor.

FIG. 5 is a block diagram illustrating an example of an internal configuration of sensor 40. Sensor 40 includes control unit 447, storage unit 442, display lamp 445, and sensor unit 453. Sensor 40 performs a predetermined detection operation, such as turning on display lamp 445, in a case where a target (for example, an intruder which is also the same for the following description) is detected by sensor unit 453.

Sensor 40 includes DECT protocol control unit 449 and DECT wireless I/F unit 448, and performs wireless connection to master device 10 by using a wireless method such as DECT, and sends sensor detection information to master device 10 when a target is detected.

Sensor unit 453 differs depending on the kind of sensor 40. For example, in a case of human sensors 40A and 40B, sensor unit 453 is a PIR sensor which detects a person through a change in infrared rays. In a case of opening/closing sensor 40D which detects opening and closing of a front door, a window, or the like, sensor unit 453 is a reed switch which switches between turned-on and turned-off states due to opening and closing. In a case of smoke sensor 40C, sensor unit 453 is a light emitting/receiving unit which detects smoke when emitted light is blocked by the smoke. Sensor unit 453 may be a temperature sensor which can detect an ambient temperature.

Sensor 40 includes rechargeable battery 450 which is rechargeable, and each unit of sensor 40 is supplied with power from rechargeable battery 450 so as to perform an operation.

Figure 6:
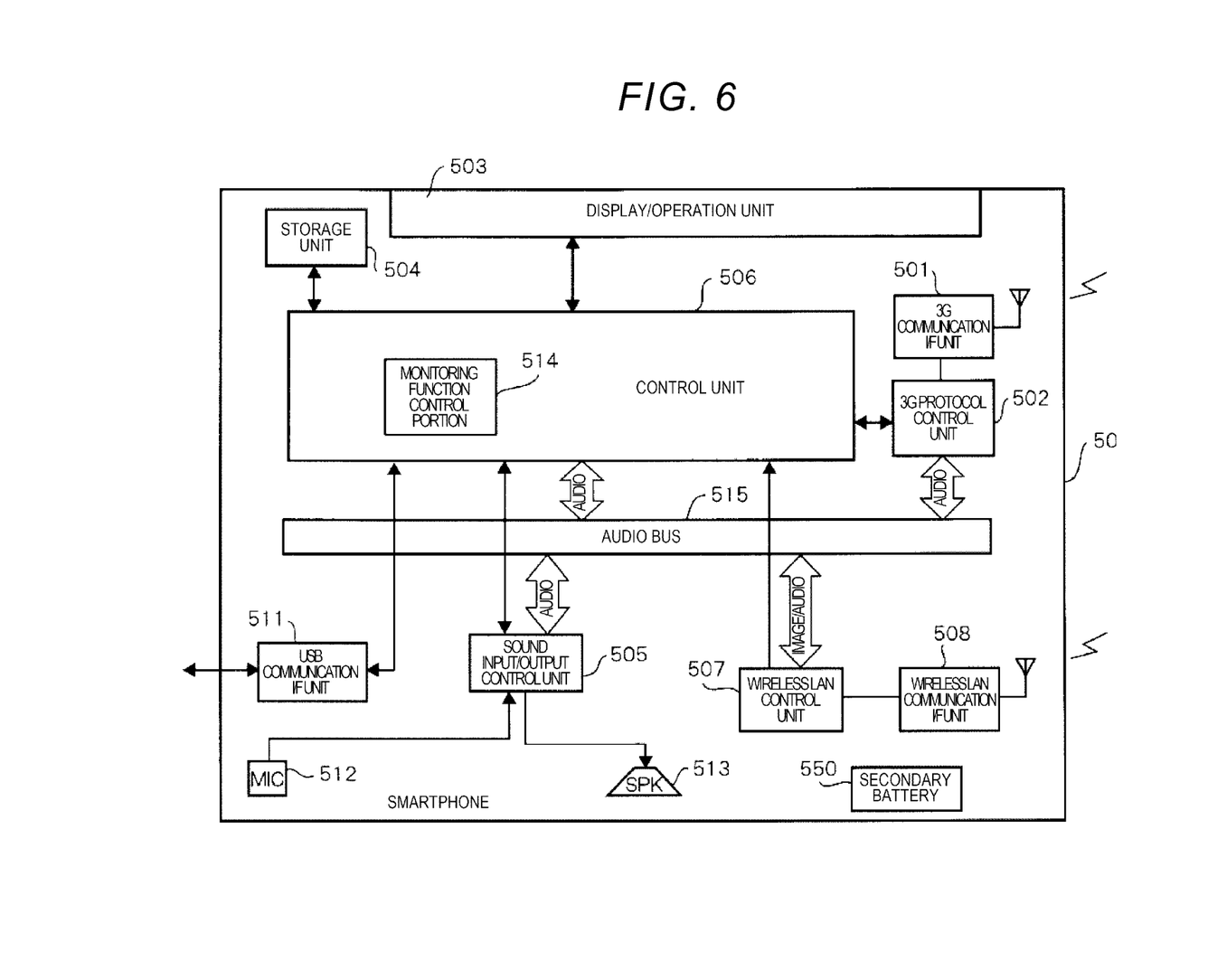
FIG. 6 is a block diagram illustrating an example of an internal configuration of a smartphone.

FIG. 6 is a block diagram illustrating an example of an internal configuration of smartphone 50. Smartphone 50 as an example of a mobile phone terminal includes control unit 506, storage unit 504, and display/operation unit (for example, touch panel) 503. Smartphone 50 receives various input operations and displays information such as an image on display/operation unit 503. Control unit 506 includes a processor and realizes a predetermined function by the processor executing a predetermined program. Monitoring function control portion 514 which can set various functions during an operation of monitoring camera system 5, such as a function of camera 30, is built into control unit 506.

As a program for realizing monitoring function control portion 514, an application for home security (hereinafter, referred to as a "home security application") is installed in smartphone 50 and is held in storage unit 504. Display/operation unit 503 constituted by a touch panel or the like, which is a display/input unit in which a display unit and an operation unit are integrally formed, displays information such as an image or an icon on a screen and receives a tap operation (or a touch operation) which is performed on the screen by a user of smartphone 50 (hereinafter, simply referred to as a "user").

Smartphone 50 includes 3G protocol control unit 502 and 3G wireless I/F unit 501, and performs wireless connection to mobile phone 70 or other smartphones connected to mobile phone network 75, by using a third generation (3G) wireless communication method. Smartphone 50 may include a protocol control unit and a wireless I/F unit corresponding to a wireless communication method (for example, HSPA or LTE) other than the 3G method.

Smartphone 50 includes audio bus 515, sound input/output control unit 505, speaker 513, and microphone 512, and performs input and output of sound to and from an external device.

Smartphone 50 includes wireless LAN control unit 507 and wireless LAN communication I/F unit 508, and transmits and receives image data and audio data to and from master device 10, camera 30, and the like via wireless router 60 connected over the wireless LAN.

Smartphone 50 includes USB communication I/F unit 511, and transmits and receives data to and from an apparatus, a memory, or the like having an interface of a universal serial bus (USB) standard. Smartphone 50 includes secondary battery 550 which is rechargeable, and each unit of smartphone 50 is supplied with power from secondary battery 550 so as to perform an operation.

A description will be made of an operation of monitoring camera system 5 having the above-described configuration.

First, descriptions will be made of an operation of smartphone 50, display of a screen and an input operation by using display/operation unit 503 during the operation. A description will be made of a case where the home security application installed in smartphone 50 is activated by the user.

Figure 7:
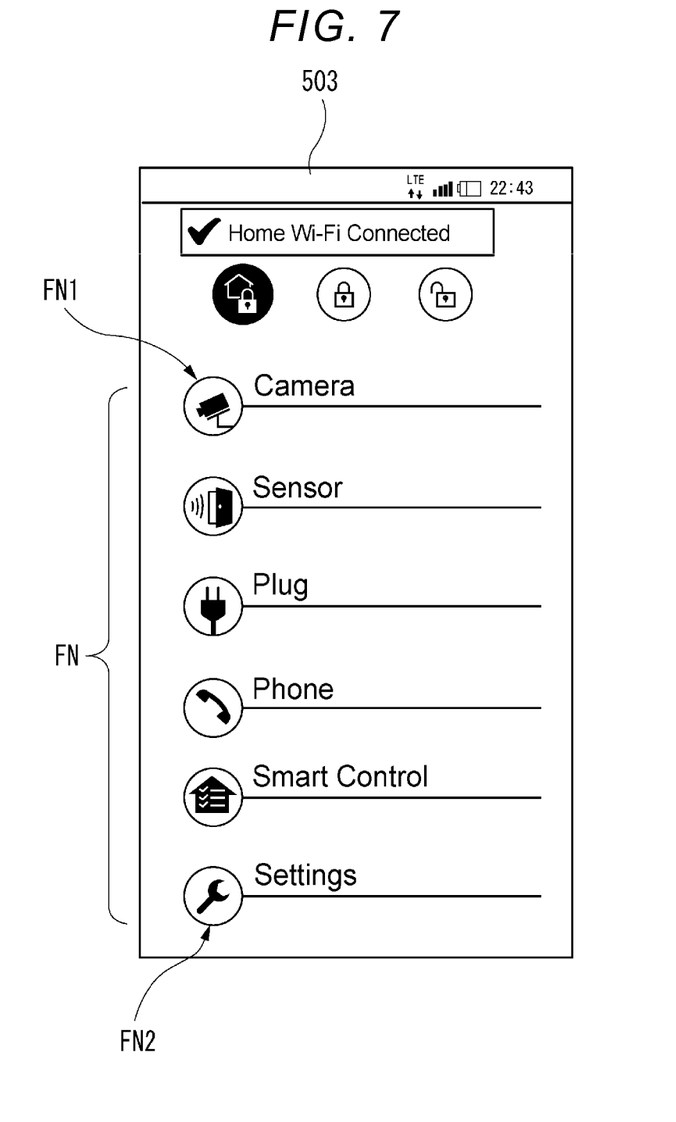
FIG. 7 is a diagram illustrating an example of an initial screen of a home security application.

FIG. 7 is a diagram illustrating an example of an initial screen of the home security application displayed on display/operation unit 503 of smartphone 50. In smartphone 50, when the home security application is activated, an initial screen is displayed on display/operation unit 503. Menu FN indicating a plurality of respective functions executed by the home security application are displayed on the initial screen. A plurality of menu items including an icon and a function name corresponding to each function are arranged and disposed in menu FN. The menu items of menu FN include camera FN1, a sensor, a power source plug, a phone, a smart control, and settings FN2.

If the user performs a tap operation on the icon of camera FN1 so as to perform an instruction operation, a monitoring screen which displays an image of a monitoring target captured by camera 30 is displayed on display/operation unit 503. If the user performs a tap operation on the icon of settings FN2 so as to perform an instruction operation, a setting screen for performing various settings of the home security application is displayed on display/operation unit 503. If the user taps a sub-menu icon on a monitoring screen so as to perform an instruction operation for calling sub-menu functions for performing various settings and operations, a sub-menu screen including a pop-up screen or the like of a box window is displayed on display/operation unit 503.

Figure 8A:
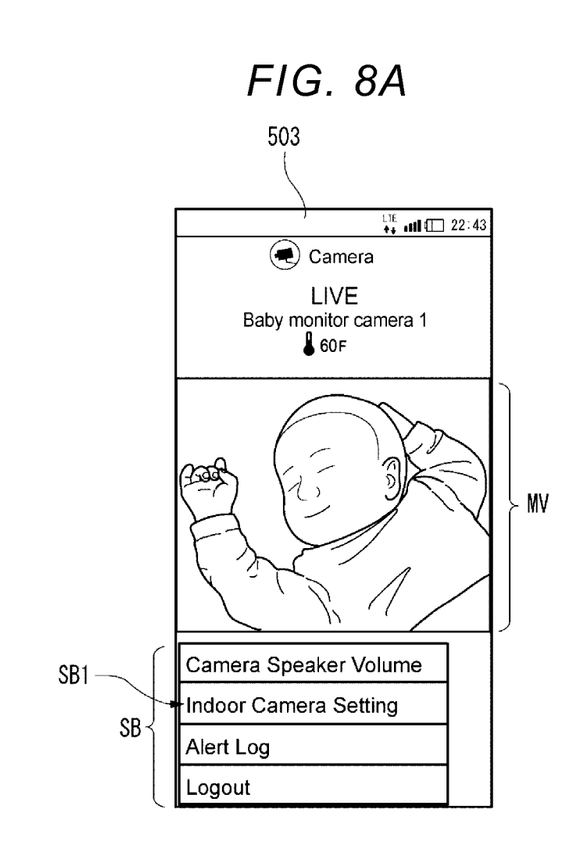
FIG. 8A is a diagram illustrating an example of a sub-menu screen displayed on a monitoring screen.
Figure 8B:
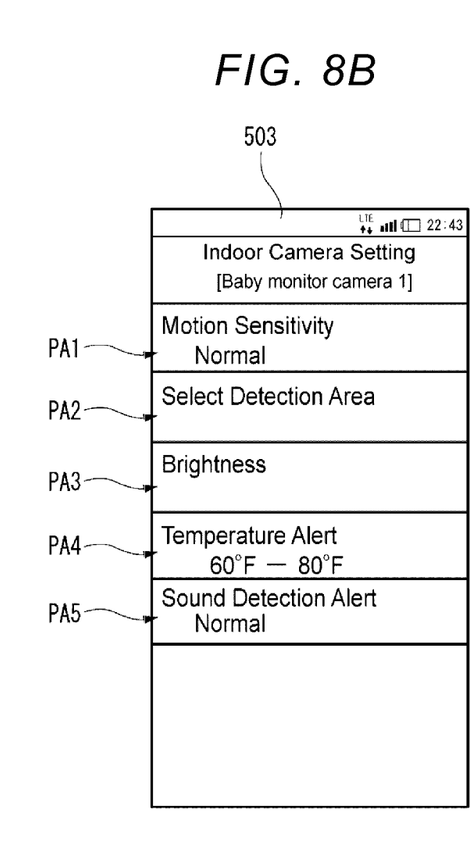
FIG. 8B is a diagram illustrating an example of a detection setting screen on the monitoring screen.

FIG. 8A is a diagram illustrating an example of a sub-menu screen displayed on a monitoring screen of display/operation unit 503 of smartphone 50, and FIG. 8B is a diagram illustrating an example of a detection setting screen. As illustrated in FIG. 8A, if the user performs an instruction operation of calling a sub-menu function on the monitoring screen which displays an image MV of a monitoring target captured by camera 30 (Baby monitor camera1), a sub-menu screen SB is displayed in a pop-up form. Sub-menu screen SB includes, as menu items, camera speaker volume, indoor camera settings SB1, alter log, and logout.

If the user performs a tap operation on the icon of indoor camera settings SB1 so as to perform an instruction operation on the sub-menu screen SB of FIG. 8A, a detection setting screen as illustrated in FIG. 8B is displayed on display/operation unit 503. The detection setting screen of FIG. 8B is a screen for performing setting of detection performed by a sensor or the like related to indoor camera 30A or baby monitoring camera 30C. Herein, a description will be made of an example of performing detection setting related to baby monitoring camera 30C.

A plurality of setting items corresponding to detection conditions of various sensors 40 are arranged and disposed on the detection setting screen of FIG. 8B. The setting items include motion detection sensitivity (Motion Sensitivity) PA1, detection area selection (Select Detection Area) PA2, detection brightness (Brightness) PA3, detection temperature (Temperature Alert) PA4, and detection volume (Sound Detection Alert) PA5.

Motion detection sensitivity PA1 is a parameter of motion detection sensitivity in a case where a motion in an image captured by camera 30. Detection area selection PA2 is a parameter of a detection target area in which a motion is detected. Detection brightness PA3 is a parameter of a brightness level corresponding to a predetermined value in a case of giving a warning when brightness around camera 30 exceeds the predetermined value. Detection temperature PA4 is a parameter of a normal temperature range corresponding to a predetermined value in a case of giving a warning when a temperature around camera 30 exceeds the predetermined value. Detection volume PA5 is a parameter of a volume level corresponding to a predetermined value in a case of giving a warning when volume of a sound around collected by camera 30 exceeds the predetermined value. In a case where such detection parameters are set by the user, and a predetermined state satisfying the detection condition occurs, the detection setting screen is displayed on display/operation unit 503 of smartphone 50, and the user is notified thereof. A warning is not limited to screen display using a detection setting screen or the like, and various notification means such as sound, light, and vibration may be used.

By performing the icon of settings FN2 on the initial screen of FIG. 7, a setting screen having the same setting items as those of the above-described detection setting screen may be displayed, and a setting operation related to a detection operation of the camera or the sensor may be performed. Regarding setting of detection parameters, a plurality of parameters may be collectively set on the detection setting screen of FIG. 8B or a setting screen which shifts from the initial screen. Regarding setting of detection parameters, a parameter may be individually set in each camera, or may be collectively set in a plurality of cameras. Regarding screen display, a sub-menu screen or a setting screen may be displayed through predetermined operation such as a menu selection operation, an icon indication operation, a gesture input operation, and a shaking operation of shaking a casing of smartphone 50.

Figure 9A:
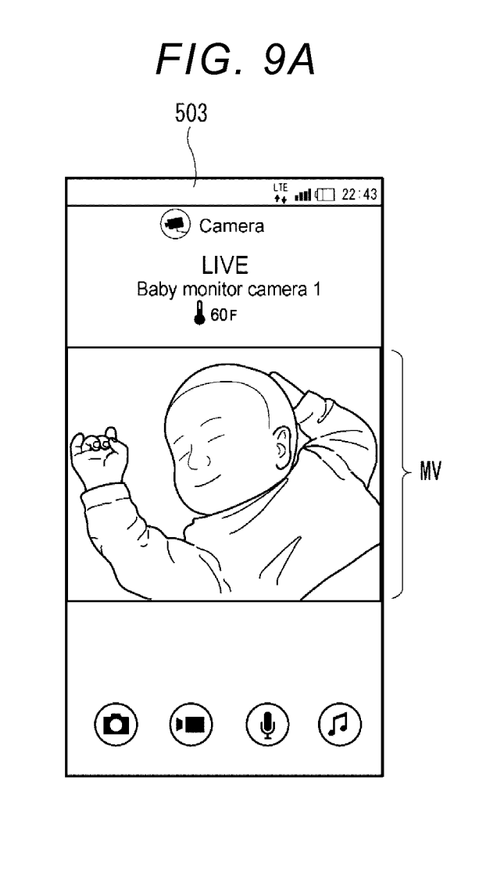
FIG. 9A is a diagram illustrating an example of a monitoring screen of the home security application.
Figure 9B:
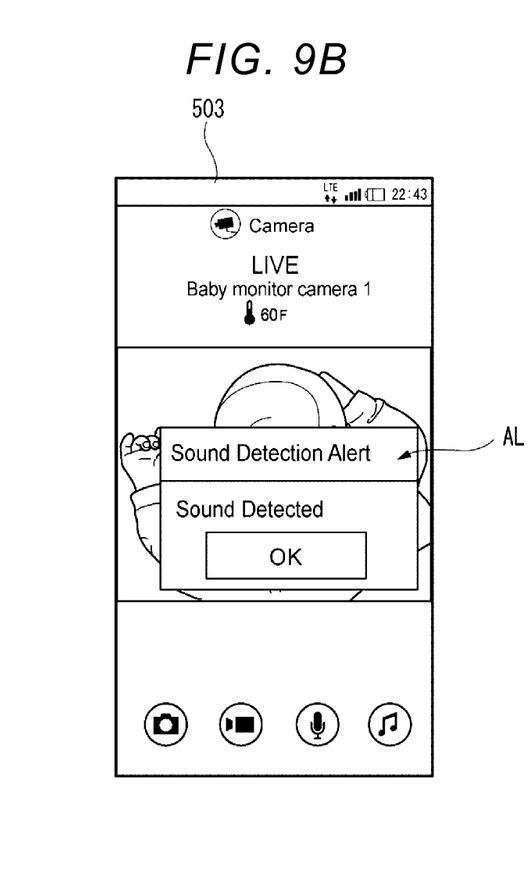
FIG. 9B is a diagram illustrating an example of a detection information screen of the home security application.

FIG. 9A is a diagram illustrating an example of a monitoring screen of the home security application displayed on display/operation unit 503 of smartphone 50, and FIG. 9B is a diagram illustrating an example of a detection information screen. If the user performs a tap operation on the icon of camera FN1 on the initial screen of FIG. 7 so as to perform an instruction operation of displaying a monitoring screen, a monitoring screen including an image MV of a monitoring target as illustrated in FIG. 9A is displayed on display/operation unit 503. FIG. 9A illustrates an example of a monitoring screen illustrating the image MV of the monitoring target captured by baby monitoring camera 30C (Baby monitor camera1).

If a state corresponding to a predetermined detection condition related to camera 30 (here, baby monitoring camera 30C) of which image capturing is in progress in a state in which the monitoring screen of FIG. 9A is displayed and the user views the image of the monitoring target, a detection information screen as illustrated in FIG. 9B is displayed on display/operation unit 503. A detection notification AL indicating detection content related to baby monitoring camera 30C is displayed on the detection information screen. Detection notification AL of the illustrated example indicates that a sound with a volume level which is equal to or higher than a predetermined value is detected around baby monitoring camera 30C (Sound Detection Alert).

A description will be made of an operation of master device 10 related to the above-described operation of smartphone 50. In monitoring camera system 5, in a case where a display operation of a monitoring screen is performed, master device 10 receives an instruction from smartphone 50 and transmits display screen information of a monitoring screen which will be displayed on display/operation unit 503 to smartphone 50. At this time, master device 10 transmits an image data transmission request (image transmission request) to camera 30, and receives image data transmitted from camera 30. Master device 10 transmits the image data acquired from camera 30 to smartphone 50. If a state satisfying a predetermined detection condition is detected by camera 30 or sensor 40, master device 10 receives a detection notification from camera 30, and transmits the detection notification to smartphone 50 so as to display a detection information screen on display/operation unit 503.

Figure 10:
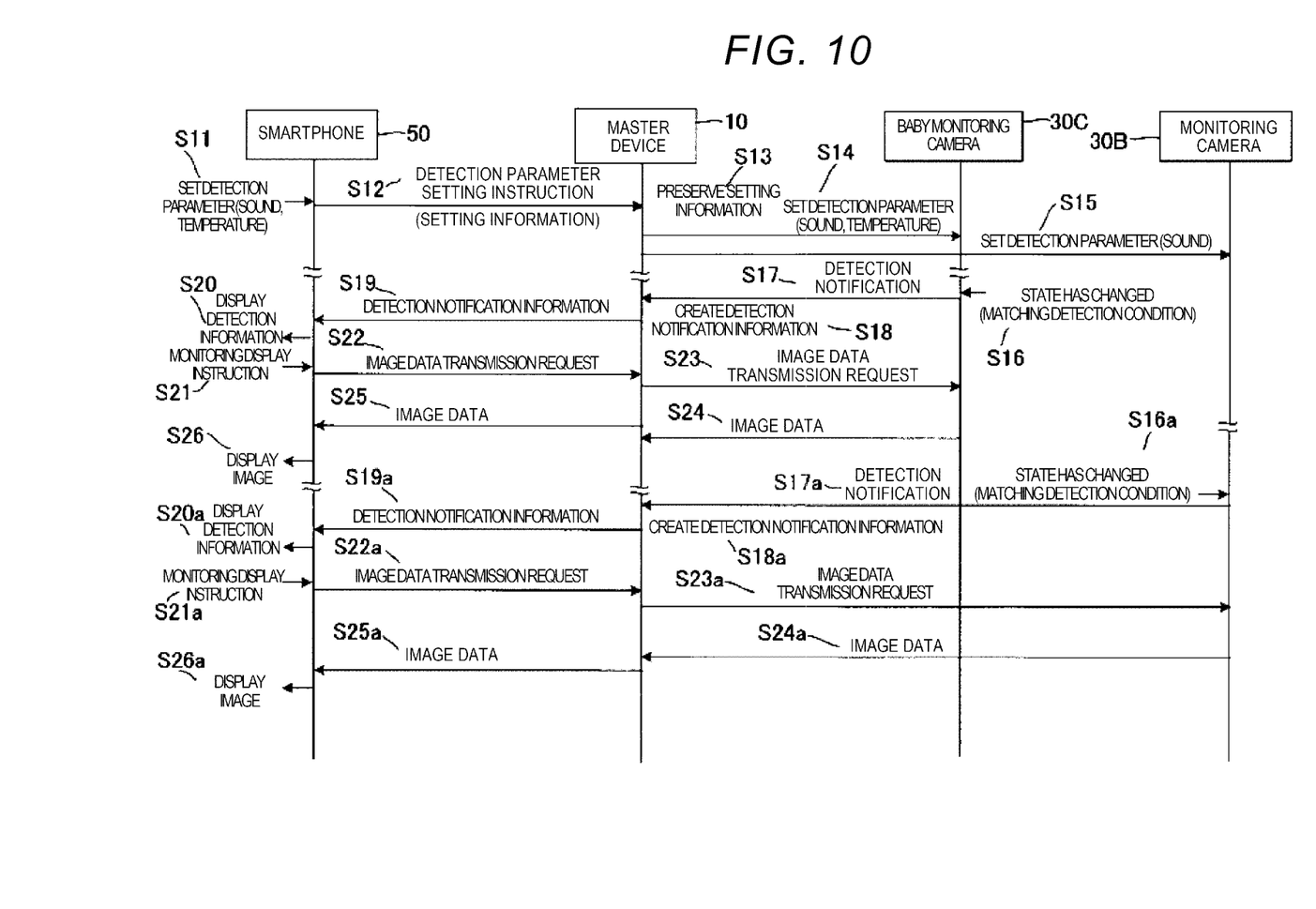
FIG. 10 is a sequence diagram illustrating an example of an operation procedure of the monitoring camera system.

Next, a description will be made of a flow of an operation of monitoring camera system 5. FIG. 10 is a sequence diagram illustrating an example of an operation procedure of monitoring camera system 5. Herein, a description will be made of an operation in a case where sound and temperature detection parameters are set in baby monitoring camera 30C, a sound detection parameter is set in monitoring camera 30B, and a state satisfying a detection condition is detected.

If smartphone 50 receives an input operation of a detection parameter setting instruction from the user through a touch operation or the like on display/operation unit 503 of smartphone 50 (step S11), smartphone 50 transmits the detection parameter setting instruction to master device 10 (step S12). At this time, the setting instruction including detection parameter setting information is transmitted. If the setting instruction is received from smartphone 50, master device 10 preserves the detection parameter setting information in storage unit 103 (step S13), and transmits the setting information to baby monitoring camera 30C and monitoring camera 30B so as to set a detection parameter therein (steps S14 and S15). In setting of a detection parameter in baby monitoring camera 30C (step S14), detection parameters of detection volume PA5 and detection temperature PA4 are set. In setting of a detection parameter in monitoring camera 30B (step S15), a detection parameter of detection volume PA5 is set.

For example, if baby monitoring camera 30C detects a state change satisfying a detection condition in which a volume level or a temperature exceeds a threshold value of the detection parameter (step S16), baby monitoring camera 30C transmits a detection notification to master device 10 (step S17). If the detection notification is received from baby monitoring camera 30C, master device 10 creates image information of a detection information screen as detection notification information regarding the volume or the temperature (step S18), and transmits the detection notification information to smartphone 50 (step S19).

If the detection notification information related to baby monitoring camera 30C is received from master device 10, smartphone 50 displays a detection information screen indicating the detection content on display/operation unit 503 (step S20). If smartphone 50 receives an input operation of a monitoring display instruction from the user through a touch operation or the like on display/operation unit 503 of smartphone 50 in this state (step S21), smartphone 50 transmits an image data transmission request to master device 10 (step S22).

If the image data transmission request is received from smartphone 50, master device 10 transmits the image data transmission request to baby monitoring camera 30C (step S23). If the image data transmission request is received from master device 10, baby monitoring camera 30C transmits image data of the monitoring target captured thereby to master device 10 (step S24). The image data includes at least one of video data of a moving image and image data of a still image. Master device 10 transmits the image data acquired from baby monitoring camera 30C to smartphone 50 (step S25). Smartphone 50 receives the image data transmitted from master device 10 and displays a monitoring screen including a moving image or a still image on display/operation unit 503 (step S26).

For example, if monitoring camera 30B detects a state change satisfying a detection condition in which a volume level exceeds a threshold value of the detection parameter (step S16*a*), monitoring camera 30B transmits a detection notification to master device 10 (step S17*a*). If the detection notification is received from monitoring camera 30B, master device 10 creates image information of a detection information screen as detection notification information regarding the volume (step S18*a*), and transmits the detection notification information to smartphone 50 (step S19*a*).

If the detection notification information related to monitoring camera 30B is received from master device 10, smartphone 50 displays a detection information screen indicating the detection content on display/operation unit 503 (step S20*a*). If smartphone 50 receives an input operation of a monitoring display instruction from the user through a touch operation or the like on display/operation unit 503 of smartphone 50 in this state (step S21*a*), smartphone 50 transmits an image data transmission request to master device 10 (step S22*a*).

Then, in the same manner as in the case of baby monitoring camera 30C, master device 10 acquires image data from monitoring camera 30B and transmits the image data to smartphone 50, and smartphone 50 displays a monitoring screen including a moving image or a still image on display/operation unit 503 (steps S23*a* to S26*a*).

As mentioned above, monitoring camera system 5 of the present embodiment includes sensor 40; camera 30 which includes image capturing unit 312, is provided in correlation with sensor 40, and has a call function; master device 10 which performs communication with camera 30 and is connected to fixed telephone network 85 so as to perform calls to another fixed telephone 80; and smartphone 50 which has display/operation unit 503, performs wireless communication with master device 10 by using wireless router 60, and is connected to another mobile phone 70 via mobile phone network 75.

Monitoring camera system 5 of the present embodiment can implement a monitoring system which is convenient to use at low cost by using a communication function of an existing fixed telephone.

In monitoring camera system 5 of the present embodiment, master device 10 stores setting information indicating a predetermined state detected by sensor 40 in storage unit 103, and transmits the setting information to sensor 40 so as to set a detection parameter therein; in a case where the predetermined state which is set by the detection parameter is detected, sensor 40 transmits a detection notification to master device 10; if the detection notification is received from sensor 40, master device 10 transmits detection notification information to smartphone 50; and smartphone 50 displays a detection information screen based on the detection notification information transmitted from master device 10 on display/operation unit 503.

In monitoring camera system 5 of the present embodiment, if a monitoring display instruction is received from smartphone 50 in a state in which the detection information screen is displayed on display/operation unit 503 of smartphone 50, master device 10 transmits an image transmission request to camera 30 correlated with sensor 40; camera 30 transmits image data acquired by image capturing unit 312 to master device 10 in response to the image transmission request from master device 10; master device 10 transmits the image data from camera 30 to smartphone 50; and smartphone 50 displays a monitoring screen of the image transmitted from master device 10 on display/operation unit 503.

In monitoring camera system 5 of the present embodiment, if a detection parameter setting instruction is received from smartphone 50, master device 10 transmits setting information corresponding to the detection parameter setting instruction to sensor 40 so as to set a detection parameter.

In monitoring camera system 5 of the present embodiment, master device 10 transmits image data of a detection information screen to smartphone 50; smartphone 50 displays the detection information screen transmitted from master device 10 on display/operation unit 503; and master device 10 receives a detection parameter setting instruction including setting information from smartphone 50.

As mentioned above, camera 30 or sensor 40 detects a state satisfying a predetermined detection condition regarding a motion, a sound, a temperature, or the like and notifies smartphone 50 of the detected state so that detection information is displayed, and thus it is possible to instantly easily understand circumstances of a monitoring target even at a remote location. For example, in a case where the present embodiment is applied to baby monitoring camera 30C, when a temperature increases up to a predetermined value or higher and thus there is a concern that a child is in danger, smartphone 50 is notified of a temperature abnormality warning, and thus the child can safely sleep even if a patron and the child are not present in the same room. Since a sound is set as a detection parameter, when the child wakes up, a volume level of a predetermined value or higher is detected and a notification thereof is sent to smartphone 50, and thus the patron can instantly take a measure.

In a case where the present embodiment is applied to outdoor monitoring camera 30B, if a temperature increases up to a predetermined value or higher and influences an operation of monitoring camera 30B, smartphone 50 is notified of a temperature abnormality warning, and thus it is possible to rapidly take a measure for protecting monitoring camera 30B.

Since smartphone 50 is notified of detection information, and then an image captured by camera 30 correlated with sensor 40 is transmitted to smartphone 50 so as to be displayed, it is possible to instantly understand the present circumstances of a monitoring target from which an abnormality or the like is detected.

A detection parameter can be easily set through an operation of smartphone 50. In a case where a plurality of detection parameters are collectively set, a user of smartphone 50 can easily perform a setting operation.

Although the various embodiments have been described with reference to the drawings, needless to say, the present invention is not limited to such embodiments. It is obvious that a person skilled in the art can conceive of various modifications or alterations within the scope recited in the claims, and thus it is understood that they naturally fall within the technical scope of the present invention. The respective constituent elements in the embodiment may be arbitrarily combined with each other within the scope without departing from the spirit of the present invention.

What is claimed is:

1. A monitoring system comprising:
   a sensor coupled to a communicator; and
   a master device that, in operation, performs wireless communication with the sensor according to a wireless communications protocol, and is connected to a fixed telephone network to communicate with other fixed telephones,
   wherein the master device, in operation, transmits image data of a detection setting screen, via a wireless router, to a smartphone that is connected to a mobile phone network to communicate with other mobile telephones, wherein the detection setting screen includes one or more setting items and is displayed on the smartphone,
   the master device, when receiving setting information regarding the one or more setting items from the smartphone, transmits the received setting information to the sensor,
   the sensor, when detecting a state specified by the setting information received from the master device, transmits a detection notification to the master device, and
   the master device, when receiving the detection notification from the sensor, transmits detection notification information to the smartphone for display on the smartphone.

2. The monitoring system of claim 1, wherein the master device includes a storage configured to store a plurality of setting items that respectively indicate a plurality of sensor detection conditions and, when receiving setting information regarding the plurality of setting items from the smartphone, transmits the plurality of setting items and the received setting information respectively regarding the plurality of setting items to the sensor.

3. The monitoring system of claim 1, further comprising a camera including an imager,
   wherein the one or more setting items include at least one of a motion detection sensitivity of the camera or the sensor, a detection area selection for the camera or the sensor, a detection brightness of the camera or the sensor, a detection temperature of the camera or the sensor, and a sound detection volume of the camera or the sensor.

4. The monitoring system of claim 1, further comprising a camera associated with the sensor and including an imager,
   wherein the master device, after displaying the detection notification information corresponding to the sensor on the smartphone, in response to a monitor display request received from the smartphone, transmits an image request to the camera,
   the camera, in response to the image request received from the master device, transmits image data captured by the imager to the master device, and
   the master device transmits the image data received from the camera to the smartphone for display on the smartphone.

5. The monitoring system of claim 1, wherein the one or more setting items include at least one of sensitivity of the sensor and a threshold value of the sensor.

6. The monitoring system of claim 1, wherein the sensor is an infrared sensor.

7. The monitoring system of claim 1, wherein the sensor is selected from a group consisting of a human sensor, a smoke sensor, an opening/closing sensor, a temperature sensor, and a sound volume sensor.

8. The monitoring system of claim 1, wherein the sensor and the master device communicate with each other according to a DECT (Digital Enhanced Cordless Telecommunications) protocol.

9. A monitoring method based on a monitoring system, the monitoring system comprising: (a) a sensor coupled to a communicator; and (b) a master device that, in operation, performs wireless communication with the sensor according to a wireless communications protocol, and is connected to a fixed telephone network to communicate with other fixed telephones, the monitoring method comprising:

transmitting, from the master device, image data of a detection setting screen, via a wireless router, to a smartphone that is connected to a mobile phone network to communicate with other mobile telephones, wherein the detection setting screen includes one or more setting items and is displayed on the smartphone,     receiving, at the master device, setting information regarding the one or more setting items from the smartphone,     transmitting, from the master device, the received setting information to the sensor,     detecting, at the sensor, a state specified by the setting information received from the master device,     transmitting, from the sensor that has detected the state, a detection notification to the master device, and     transmitting, from the master device that has received the detection notification from the sensor, detection notification information to the smartphone for display on the smartphone.

10. The monitoring method of claim 9, further comprising:

storing, at the master device, a plurality of setting items that respectively indicate a plurality of sensor detection conditions,     receiving, at the master device, setting information regarding the plurality of setting items from the smartphone, and     transmitting, from the master device, the plurality of setting items and the setting information respectively regarding the plurality of setting items to the sensor.

11. The monitoring method of claim 9, wherein the monitoring system further comprises a camera including an imager,     wherein the one or more setting items include at least one of a motion detection sensitivity of the camera or the sensor, a detection area selection for the camera or the sensor, a detection brightness of the camera or the sensor, a detection temperature of the camera or the sensor, and a sound detection volume of the camera or the sensor.

12. The monitoring method of claim 9, wherein the monitoring system further comprises a camera associated with the sensor and including an imager, and the monitoring method further comprises:

receiving, at the master device that has displayed the detection notification information corresponding to the sensor on the smartphone, a monitor display request from the smartphone,     transmitting, from the master device that has received the monitor display request, an image request to the camera,     transmitting, from the camera that has received the image request, image data captured by the imager to the master device, and     transmitting, from the master device, the image data received from the camera to the smartphone for display on the smartphone.

13. The monitoring method of claim 9, wherein the one or more setting items include at least one of sensitivity of the sensor and a threshold value of the sensor.

14. The monitoring method of claim 9, wherein the sensor is an infrared sensor.

15. The monitoring method of claim 9, wherein the sensor is selected from a group consisting of a human sensor, a smoke sensor, an opening/closing sensor, a temperature sensor, and a sound volume sensor.

16. The monitoring method of claim 9, wherein the sensor and the master device communicate with each other according to a DECT (Digital Enhanced Cordless Telecommunications) protocol.

\* \* \* \* \*